US009716653B2

(12) United States Patent
Gage

(10) Patent No.: US 9,716,653 B2
(45) Date of Patent: Jul. 25, 2017

(54) SYSTEM AND METHOD FOR FLOW-BASED ADDRESSING IN A MOBILE ENVIRONMENT

(71) Applicant: Huawei Technologies Co., Ltd., Shenzhen (CN)

(72) Inventor: William Anthony Gage, Stittsville (CA)

(73) Assignee: Hauwei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/843,277

(22) Filed: Sep. 2, 2015

(65) Prior Publication Data

US 2016/0142321 A1 May 19, 2016

Related U.S. Application Data

(60) Provisional application No. 62/081,383, filed on Nov. 18, 2014.

(51) Int. Cl.
*H04L 12/741* (2013.01)
*H04W 4/00* (2009.01)
(Continued)

(52) U.S. Cl.
CPC .............. *H04L 45/74* (2013.01); *H04L 47/18* (2013.01); *H04L 47/2483* (2013.01);
(Continued)

(58) Field of Classification Search
CPC ..... H04L 45/74; H04L 47/18; H04L 47/2483; H04L 69/22; H04L 61/2092;
(Continued)

(56) References Cited

U.S. PATENT DOCUMENTS 7,076,547 B1 * 7/2006 Black .................. H04L 41/5003
709/224
8,411,685 B1 * 4/2013 Bennett, III ........ H04L 61/6059
370/392
(Continued)

FOREIGN PATENT DOCUMENTS

CN 101047614 A 10/2007

OTHER PUBLICATIONS

3GPP, "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 13)," 3GPP TS 26.247 V13.0.0, Dec. 2014, 119 pgs.
(Continued)

*Primary Examiner* — Mohammad Anwar
(74) *Attorney, Agent, or Firm* — Slater Matsil, LLP

(57) ABSTRACT

Embedding a flow handle (FH) in an IPv6 address portion of a packet may reduce the amount of overhead needed to support path selection in flow-based packet forwarding. The FH may replace an interface identifier in a standard IPv6 address such that the FH does not add any additional overhead to the IPv6 packet itself. Information specified by the FH embedded in the IPv6 address may be used to select the path or next-hop. In addition, the FH may identify a quality of service (QoS) requirement associated with the packet, and the route selection function may identify a path capable of satisfying the QoS requirement, a service function chain (SFC) ID, an access point (AP) ID, a radio bearer ID, a path ID, and/or a device ID.

30 Claims, 10 Drawing Sheets

(51) Int. Cl.
*H04L 12/801* (2013.01)
*H04L 12/851* (2013.01)
*H04L 29/12* (2006.01)

(52) U.S. Cl.
CPC ......... *H04W 4/005* (2013.01); *H04L 61/2007* (2013.01); *H04L 61/2092* (2013.01); *H04L 61/6004* (2013.01); *H04L 61/6022* (2013.01); *H04L 61/6059* (2013.01)

(58) Field of Classification Search
CPC .............. H04L 61/2007; H04L 61/6004; H04L 61/6022; H04L 61/6059; H04W 4/005
See application file for complete search history.

(56) References Cited

U.S. PATENT DOCUMENTS

| | | | |
|---|---|---|---|
| 2007/0002873 A1* | 1/2007 | Maekawa | H04L 12/4633 370/398 |
| 2007/0086486 A1 | 4/2007 | Park et al. | |
| 2009/0103541 A1 | 4/2009 | Lin | |
| 2010/0208698 A1* | 8/2010 | Lu | H04W 36/0027 370/331 |
| 2013/0205376 A1* | 8/2013 | Narasimha | H04L 9/3247 726/6 |
| 2014/0269319 A1* | 9/2014 | DeCusatis | H04L 47/12 370/236 |
| 2016/0127318 A1* | 5/2016 | Hua | H04L 63/0263 726/1 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 10)," 3GPP TS 36.321 V12.6.0, Jun. 2015, 77 pgs.
Amante, S., et al., "IPv6 Flow Label Specification," RFC 6437, Nov. 2011, 15 pgs.
Babiarz, J., et al., "Configuration Guidelines for DiffServ Service Classes," RFC 4594, Aug. 2006, 57 pgs.
Baker, F., Requirements and Use Cases for Source/Destination Routing, Network Working Group Internet-Draft, Oct. 21, 2014, 10 pgs.
Caida, "Trace Statistics for CAIDA Passive OC48 and OC192 Traces," The CAIDA UCSD Statistical information for the CAIDA Anonymized Internet Traces, http://www.caida.org/data/passive/passive_trace_statistics.xml, retrieved Apr. 12, 2016, 19 pages.
Claise, B., et al., "Cisco Systems Netflow Services Export Version 9," RFC 3954, Oct. 2004, 33 pages.
Fielding, R., et al., "Hypertext Transfer Protocol (HTTP/1.1); Range Request," RFC 7233, Jun. 2014, 25 pages.
Gont, F., "A Method for Generating Semantically Opaque Interface Identifiers with IPv6 Stateless Address Autoconfiguration (SLAAC)," RFC 7217, Apr. 2014, 20 pages.
Gundavelli, S., et al., Proxy Mobile IPv6, RFC 5213, Aug. 2008, 92 pgs.
Halpern, J., et al., "Service Function Chaining (SFC) Architecture," RFC 7665, Oct. 2015, 32 pages.
Hinden, R., et al., "IP Version 6 Addressing Architecture," RFE 4291, Feb. 2006, 25 pages.
"Interesting stats", HTTP Archive, http://httparchive.org/interesting.php. Retrieved Apr. 12, 2016, 9 pages.
Lasserre, M., et al., "Framework for Data Center (DC) Network Virtualization," RFC 7365, Oct. 2014, 26 pages.
Open Networking Foundation, "SDN Architecture", ONF TR-521 Issue 1.1, 2016, 59 pages.
Perkins, C., et al., "Mobility Support in IPv6," RFC 6275, Jul. 2011, 169 pages.
Tsirtsis, G., et al., "Flow Bindings in Mobile IPv6 and Network Mobility (NEMO) Basic Support," RFC 6089, Jan. 2011, 31 pgs.
Rosen, E., et al., "Multiprotocol Label Switching Architecture," RFC 3031, Jan. 2001, 61 pages.
Song, H., "Protocol-Oblivious Forwarding: Unleash the Power of SDN Through a Future-Proof Forwarding Plane", Proceeding of the 2nd ACM SIGCOMM Workshop Hot Topics Software Defined Networking, Aug. 12-16, 2013, pp. 127-132.
3GPP, "3rd Generation Partnership Project; Technical Specification Group Services and System Aspects; Group based Enhancements (Release 13)," 3GPP TR 23.769 V13.0.0, Jun. 2015, 38 pgs.
Tsirtsis, G., et al., Flow Bindings in Mobile IPv6 and Network Mobility (NEMO) Basic Support, RFC 5648, Jan. 2011, 31 pgs.
"Quick UDP Internet Connections (QUIC)", Wikipedia: https://en.wikipedia.org/wiki/QUIC. Retrieved Apr. 12, 2016, 4 pages.

* cited by examiner

SYSTEM AND METHOD FOR FLOW-BASED ADDRESSING IN A MOBILE ENVIRONMENT

This patent application claims priority to U.S. Provisional Application No. 62/081,383, filed on Nov. 18, 2014 and entitled "System and Method for Flow-Based Addressing in a Mobile Environment," which is hereby incorporated by reference herein as if reproduced in its entirety.

TECHNICAL FIELDS

The present invention relates to a system and method for packet-based communications, and, in particular embodiments, to a system and method for flow-based addressing in a mobile environment using the Internet Protocol (IP).

BACKGROUND

Packet-based communication networks may utilize flow-based packet forwarding techniques such that different traffic flows may be transported over different paths. For example, an upstream packet flow and a downstream packet flow between the same network nodes may be transported over different network paths for various reasons, e.g., packet processing requirements, available link capacity, etc. Flow-based packet forwarding techniques may forward packet flows over traffic engineered (TE) paths to meet quality of service (QoS) requirements of the packet flows. In addition, flow-based packet forwarding techniques may forward traffic flows through packet-processing elements or nodes that perform specialized processing (e.g., firewall, encryption, compression) on packets in the traffic flows.

In a conventional packet-based network using the Internet Protocol version 6 (IPv6), various fields in the IP packet header such as the flow label and traffic class may to used to determine how a packet should be treated by network nodes that receive the packet. However these fields only have significance in one direction (e.g. from Node A to Node B) and cannot be used to affect the path and the treatment of flows travelling in the reverse direction (e.g. from Node B to Node A). In addition, these fields may be changed anywhere along the path from the packet source to its destination, and therefore may not be preserved across the entire end-to-end path.

In a conventional packet-based network, a device must acquire a new IP address whenever it changes its point of attachment. This may incur a significant amount of signaling overhead. In addition, this can disrupt any existing packet flows in progress that are associated with an old IP address.

In a conventional mobile environment where a device may move from one network attachment point to another without changing its IP address, additional information such as a tunnel header may need to be attached to a packet to ensure that the packet is forwarded from a network ingress node to the network attachment point currently used by the device. Tunneling solutions such as those using the Proxy Mobile Internet Protocol version 6 (PMIPv6) require maintenance of tunnel context at the tunnel end points, require control signaling between the tunnel end points, introduce tunnel packet overheads, encapsulate all flows addressed to a particular device or device interface within the same tunnel, and force all flows addressed to a particular device or device interface to be routed through the same network ingress/egress node. Some variants of these protocols support encapsulation of different packet flows within different tunnels but these solutions incur a commensurate increase in the number of tunnel addresses that must be allocated, in the amount of context information that must be maintain by the tunnel end points, and in the amount of signaling that must be exchanged between the tunnel end points.

Therefore there exists a need to reduce the overheads associated with forwarding packets in a mobile environment while, at the same time, enabling flow-specific treatment of packets in order to meet QoS and service-specific processing requirements.

SUMMARY OF THE INVENTION

Technical advantages are generally achieved, by embodiments of this disclosure which describe system and method for flow-based addressing in a mobile environment.

In accordance with an embodiment, a method for communicating a packet flow in a communication network is provided. In this example, the method includes embedding a first flow handle (FH) into an Internet Protocol (IP) version six (IPv6) address of a first packet, and transmitting the first packet to a second network node. The second network node processes or forwards the first packet in accordance with flow information included in the first FH. An apparatus for performing this method is also provided.

In accordance with another embodiment, a method for processing or forwarding a packet received over a communication network is provided. In this example, the method includes receiving a packet from a first network node. A flow handle (FH) is embedded in an Internet Protocol (IP) version six (IPv6) address of the packet. The method further includes processing or forwarding the packet in accordance with flow information specified by the FH embedded in the IPv6 address of the packet. An apparatus for performing this method is also provided.

In accordance with yet another embodiment, a method for allocating Internet Protocol (IP) version six (IPv6) network addresses is provided. In this example, the method includes determining that a first packet flow associated with a device and a second packet flow associated with the device have been initiated, and assigning, from a pool of available addresses, a first IPv6 address to the first packet flow and a second IPv6 address to the second packet flow. The first IPv6 address is different than the second IPv6 address. The method further includes inserting the first IPv6 address into an address field of at least one packet associated with the first packet flow, inserting the second IPv6 address into an address field of at least one packet associated with the second packet flow, and communicating packets associated with the first packet flow and the second packet flow over a network. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
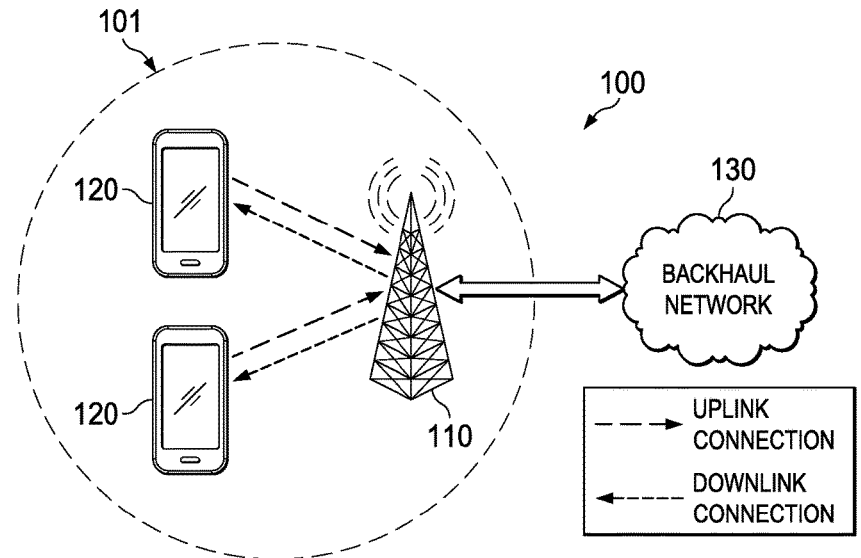
FIG. 1 illustrates a diagram of an embodiment wireless network.

Corresponding numerals and symbols in the different figures generally refer to corresponding parts unless otherwise indicated. The figures are drawn to clearly illustrate the relevant aspects of the embodiments and are not necessarily drawn to scale. Throughout this document, the terms "IPv6" and "IP" may be used interchangeably.

DETAILED DESCRIPTION OF ILLUSTRATIVE EMBODIMENTS

The structure, manufacture and use of the disclosed embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In Internet Protocol version 6 (IPv6) networks, flow-based packet forwarding is generally achieved by attaching flow handling information to the Internet Protocol (IP) header of packets. The flow handling information may include a flow label or other information (e.g., list of next-hop addresses, quality of service (QoS) requirement), and may ensure that intermediate nodes forward the packets over an appropriate path, e.g., a path specified by the flow label, a path to the designated next hop, etc. In a mobile IP environment, a tunnel header such as that used by the Proxy Mobile IPv6 protocol is often attached to an IP packet to ensure that the packet is forwarded to the network attachment point currently used by the device. Similarly, service function chaining may require the attachment of a network service header to an IP packet to direct the packet over a specific service function path. Unfortunately, attaching flow handling information to the packet adds additional overhead to the traffic flow and may require additional signaling to coordinate the flow handling information, which increases the amount of network resources required to transport the packet payload. Accordingly, techniques for reducing an amount of overhead required to achieve flow-based forwarding in IPv6 networks are desired.

Aspects of this disclosure embed a flow handle (FH) in an IPv6 address portion of a packet to reduce the overhead needed to support path selection in flow-based packet forwarding. More specifically, the FH may replace an interface identifier in a standard IPv6 address, and consequently may not add any additional overhead to the IPv6 packet itself. In an embodiment, the FH may be embedded in the least significant bits (e.g., right-most 64 bits) portion of the IPv6 address of the packet. The FH in the IPv6 address portion of the packet may provide information used for processing the packet. When a network node receives a packet including an FH, the network node may identify a path or a next-hop address based on the information specified by the FH embedded in the IPv6 address portion of the packet (e.g., using a conventional route selection function, such as a longest prefix match or protocol oblivious forwarding function), and then forward the packet over the identified path or to the identified next hop. Advantageously, information specified by the FH embedded in the IPv6 address may be used in conjunction with a conventional route selection function/algorithm (e.g., longest prefix match, protocol oblivious forwarding function, etc.) to select the path or next-hop. In this way, the FH embedded in the IPv6 address may be backwards compatible with the route selection function/algorithm used in legacy devices, which may allow the FH embedded IPv6 addresses to be used to implement flow-based forwarding without having to modify or reconfigure existing routers and other network nodes. In addition, the FH may identify a quality of service (QoS) requirement associated with the packet, and the route selection function may identify a path capable of satisfying the QoS requirement (e.g., using a route selection function, such as a longest prefix match or protocol oblivious forwarding function). The FH may comprise a service function chain (SFC) ID that is used to forward the packet along a pre-defined SFC, an access point (AP) ID that identifies a network AP, a radio bearer ID that identifies a radio access link connection, a path ID that is used to forward the packet over a pre-defined path, a quality of service (QoS) code point that identifies a QoS requirement of the packet, and/or a device ID that identifies an end node (e.g., wireless device). In many cases, a route selection function, such as a longest prefix match or protocol oblivious forwarding function, may be advantageously used to identify the appropriate path or next-hop address. These and other details are described in greater detail below.

A FH may be constructed by a network node or may be constructed by a device based on instructions received from the network. For instance, in a wireless communication network, a network node (e.g., AP) may send an instruction command that instructs a wireless device (WD) to construct and insert the FH into the IPv6 address portion of a packet. In one example, an AP may send an instruction command to a WD using a device-specific radio resource control (RRC) signaling message. In another example, an enhanced NodeB (eNB) (e.g., an AP in a 3GPP Long Term Evolution (LTE) system) may broadcast an instruction command to one or more WDs using a system information block (SIB). In such examples, the instruction command may include a template and a policy rule indicating information that should be included in the FH embedded in the IPv6 source address portion of the packet.

FIG. 1 illustrates a wireless network 100 for communicating data. The wireless network 100 includes an access point (AP) 110 having a coverage area 101, a plurality of wireless devices 120, and a backhaul network 130. The AP 110 may comprise any component capable of providing wireless access by, among other things, establishing uplink (dashed line) and/or downlink (dotted line) connections with the wireless devices 120, such as a base station, an enhanced NodeB (eNB), a femtocell, and other wirelessly enabled devices. The wireless devices 120 may comprise any component capable of establishing a wireless connection with the AP 110, such as a mobile station (STA), a machine-type communications (MTC) device, user equipment (UE), or other wirelessly enabled devices. The backhaul network 130 may be any component or collection of components that allow data to be exchanged between the AP 110 and a remote node. In some embodiments, there may be multiple such networks, and/or the network may comprise various other wireless devices, such as relays, low power nodes, etc.

Figure 2:
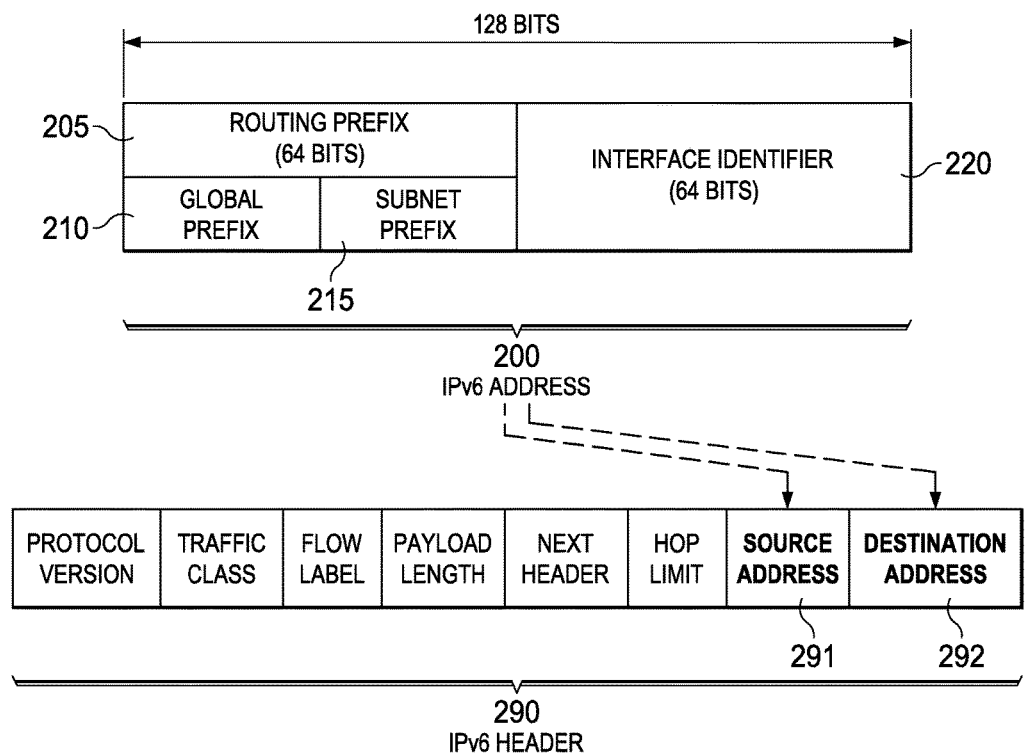
FIG. 2 illustrates a diagram of a conventional Internet Protocol version 6 (IPv6) address and packet header.

FIG. 2 illustrates a diagram of a conventional Internet Protocol version 6 (IPv6) address 200. As shown, the 128-bit IPv6 address 200 comprises a routing prefix 205 and an interface identifier 220. The routing prefix 205 is located in the most significant bits of the IPv6 address, and includes a global prefix 210 and a subnet prefix 215. The global prefix 210 is used for routing packets within an internet-at-large while in the subnet prefix 215 is used for routing packets within a local network. The interface identifier 220 located in the least significant bits of the IPv6 address identifies an interface on an end node. Typically, the routing prefix 205 occupies the most significant 64 bits of an address and the interface identifier 220 occupies the least significant 64 bits of the address, however other arrangements of the 128-bit address are also possible. The IPv6 address 200 may be a source address 291 or a destination address 292 in an IPv6 header 290. Although packets may be described as traversing the internet-at-large, it should be understood that the destination for the packets need not be outside the network segment on which the packets are received. For example, in a wireless communication network, the destination nodes may be a part of the radio access network.

Figure 3:
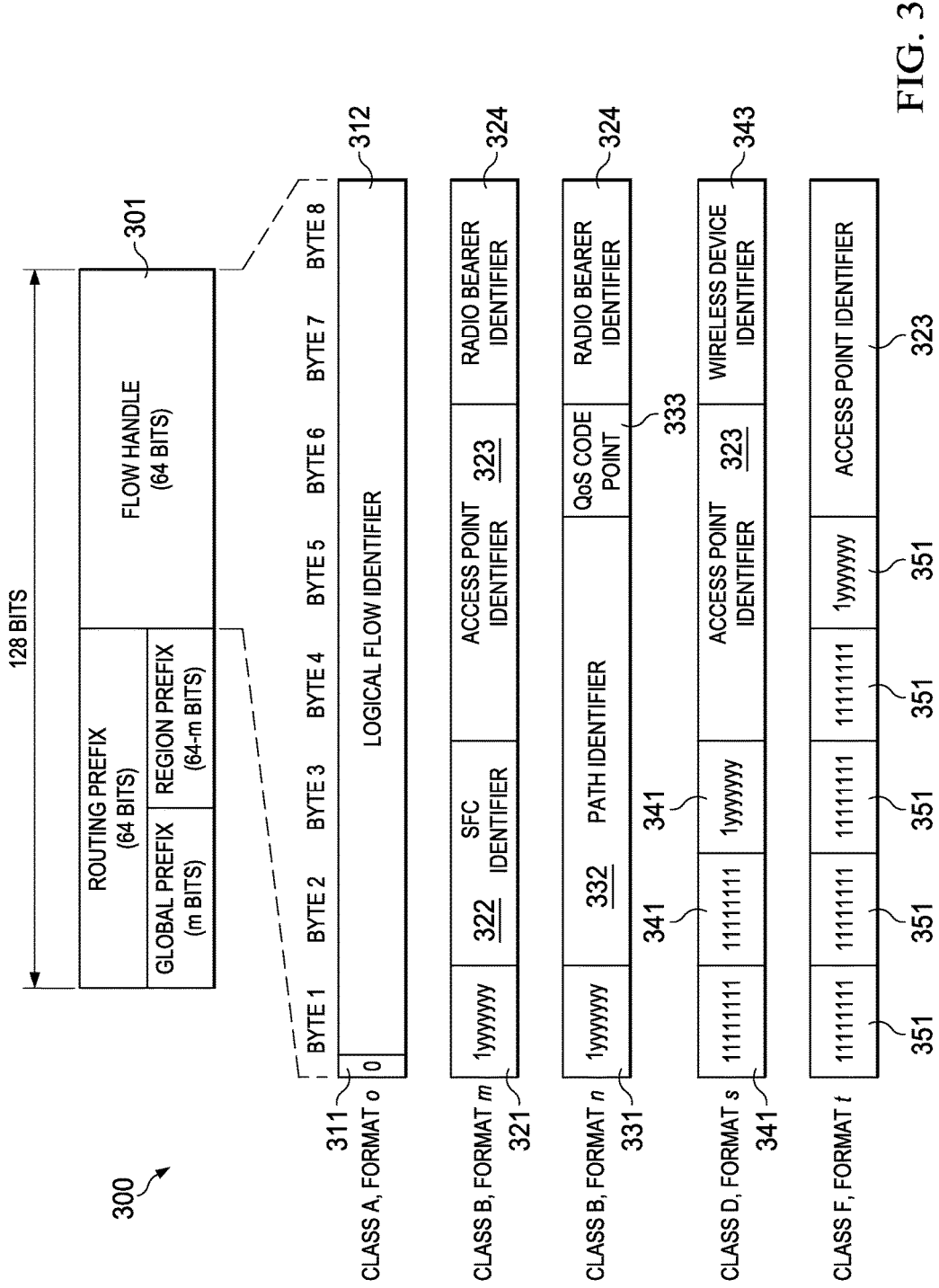
FIG. 3 illustrates a diagram of an embodiment flow handle (FH)

FIG. 3 illustrates a diagram of an embodiment IPv6 address 300 carrying a flow handle (FH) 301. As shown, the FH 301 is embedded in the least significant bits of the IPv6 address 300. The FH 301 may include context information specifying instructions for processing a packet to which the IPv6 address 300 is attached. Accordingly, the FH 301 conveys flow handling information to a network node that is used to process or forward the packet. For example, when a network node receives a packet encapsulated by the IPv6 address 300, the network node identifies a path or a next-hop based on information (e.g., a path identifier (ID), a QoS requirement etc.) specified by the FH 301 that is embedded in the IPv6 address 300 of the packet, and then processes or forwards the packet over the identified path or to the identified next-hop.

The FH 301 may include a logical flow identifier (ID) 312, a service function chain (SFC) identifier (ID) 322, an access point (AP) identifier (ID) 323, a radio bearer identifier (ID) 324, a path identifier (ID) 332, a QoS code point 333, a wireless device (WD) identifier (ID) 343 or combinations thereof. The logical flow ID 312 identifies a particular sequence of packets. The SFC ID 322 identifies a pre-defined service function chain. The AP ID 323 identifies a network access point. The radio bearer ID 324 identifies a radio access link connection. The path ID 332 identifies a pre-defined path through the network. The QoS code point 333 identifies a QoS requirement of the packet. The WD ID 343 identifies a wireless device and/or end node.

The FH 301 carries various different types of information. The types of information may depend on a class and/or format of the FH 301. In one example, the FH 301 carries a format field 311 and logical flow ID field 312 when the FH 301 has a first format (e.g., Class A, Format 0). In another example, the FH 301 carries a format field 321, an SFC ID field 322, an AP ID field 323, and a radio bearer ID field 324 when the FH 301 has a second format (e.g., Class B, Format m). In yet another example, the FH 301 carries a format field 331, a path ID field 332, a QoS code point field 333, and a radio bearer ID field 334 when the FH 301 has a third format (e.g., Class B, Format n). In yet another example, the FH 301 carries a format field 341, an AP ID field 342, and a WD ID field 343 when the FH 301 has a fourth format (e.g., Class D, Format s). In yet another example, the FH 301 carries a format field 351, and an AP ID field 352 when the FH 301 has a fifth format (e.g., Class F, Format t). The format fields 311, 321, 331, 341, 351 may include a value (e.g., 0, 1yyyyyyy, 11111111 . . . 1yyyyyyy, etc., where y is a bit of the format identifier) that identifies a format of the FH 301. Different formats may carry various different types of information.

Figure 4:
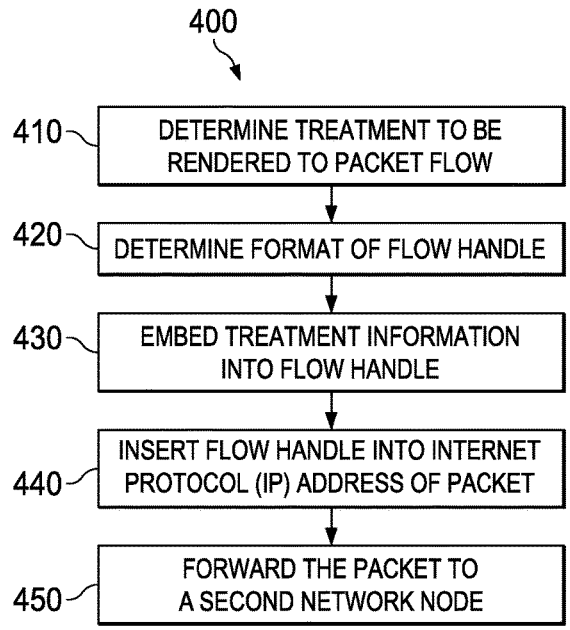
FIG. 4 illustrates a flowchart of an embodiment method for flow-based addressing in a source node.

FIG. 4 illustrates a flowchart of an embodiment method 400 for flow-based addressing in a communication network, as might be performed by a source node when a packet flow transmission is initiated.

As shown, the method 400 begins at step 410, where the source node determines the treatment to be rendered to the packet flow. The source node may be a network node (e.g. an AP), a device, or a device operating under instructions from a network node. The source node may determine the treatment based on one or more of the following: one or more fields from the IP header, a transport header (e.g. TCP, UDP), or an application header (e.g. HTTP, RTP); the type of device (e.g. mobile or fixed); the class of device (e.g. Machine-Type Communications Device or Human-Type Communications Device); information received from an application on the device; information received from a Traffic Management (TM) entity; the type of access link used by the device (e.g. wired or wireless); and the (characteristics of the) access link used by the device (e.g. radio access bearer channel). In step 420, the source node determines the appropriate format of a flow handle based on the information that needs to be conveyed in the flow handle to reflect the treatment to be rendered to the packet flow. The information may comprise a packet flow ID identifying a particular sequence of packets, a service function chain (SFC) ID to forward a packet along a pre-defined SFC, an access point (AP) ID identifying a network AP, a radio access bearer ID identifying a radio access link connection, a path ID to forward a packet over a pre-defined path, a quality of service (QoS) code point identifying a QoS requirement of the packet, and/or a device ID identifying an end node. In one embodiment, a network edge node (e.g., an AP) instructs a device to embed an FH in the IPv6 address portion of a packet before transmitting the packet to the AP. In such an embodiment, the AP sends an instruction command to the device that may include the selected flow handle format and a policy rule for embedding the FH in the IPv6 address portion of the packet. In a wireless network, the instruction may be sent to a wireless device (WD) using either a dedicated radio resource control (RRC) signaling message or broadcast, for example, in a system information block (SIB). The instructions may be provided on a per-flow basis (e.g. whenever a new packet flow is initiated), or on a per-radio access bearer (RAB) basis (e.g. for all packet flows transmitted over a particular RAB), on a per-device or per-interface basis (e.g. for all packet flows transmitted by that device or over a particular device interface), or on a per-group basis (e.g. for all packet flows transmitted by a particular group of devices). In step 430, the source node embeds the treatment information into the corresponding fields of the selected flow handle. In step 440, the source node inserts the flow handle into an address portion of the IP packet header. Subsequently, in step 450, the source node forwards the packet with the embedded flow handle to a next network node. The FH may provide the next network node with information to process or forward the packet in accordance with the required flow handling treatment. While much of this disclosure discusses inserting FH embedded IPv6 addresses into source address fields of IPv6 headers, it should be appreciated that many of the inventive concepts can also be applied when inserting FH embedded IPv6 addresses into destination address fields of IPv6 headers.

Figure 5:
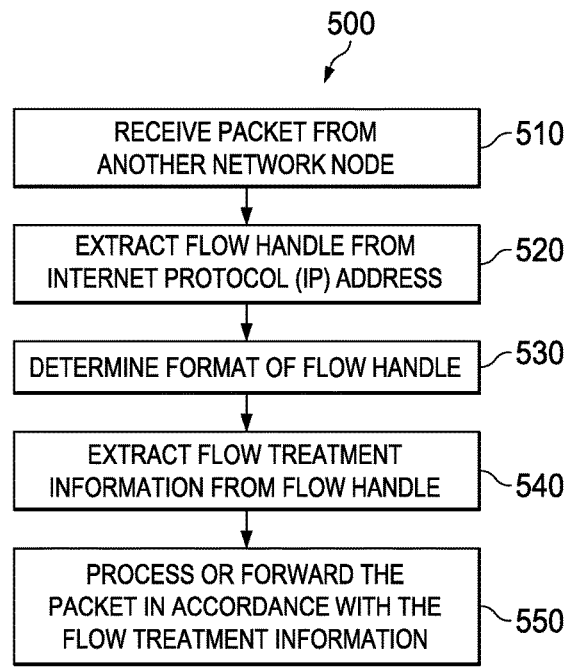
FIG. 5 illustrates a flowchart of an embodiment method for flow-based addressing in a transit network node.

FIG. 5 illustrates a flowchart of an embodiment method 500 for flow-based addressing in a communication network node, as might be performed by a transit node when receiving a packet from another network node.

As shown, the method 500 begins at step 510, where the transit node receives a packet from another network node. In step 520, the transit node extracts a flow handle from an Internet Protocol (IP) address portion of the packet. In step 530, the transit node determines the format of the flow handle. In step 540, based on the format of the flow handle, the transit node extracts flow processing information from the handle specifying the treatment to be provided to the packet. Subsequently, the method 500 proceeds to step 550, where the transit node processes or forwards the packet in accordance with the information specified by the FH. In an embodiment, the transit node identifies a path or a next-hop associated with the information specified by the FH embedded in the IP address portion of the packet, and then forwards the packet over an identified path or to an identified next-hop. In another embodiment, the transit node identifies a quality of service (QoS) requirement associated with the FH, and then forwards the packet over a path capable of satisfying the QoS requirement. In yet another embodiment, the transit node identifies a service function chain that defines a processing task (e.g., filtering, firewall, etc.) associated with the FH, and then either performs the processing task on the packet, or otherwise forwards the packet to a next network node capable of performing the processing task.

Figure 6A:
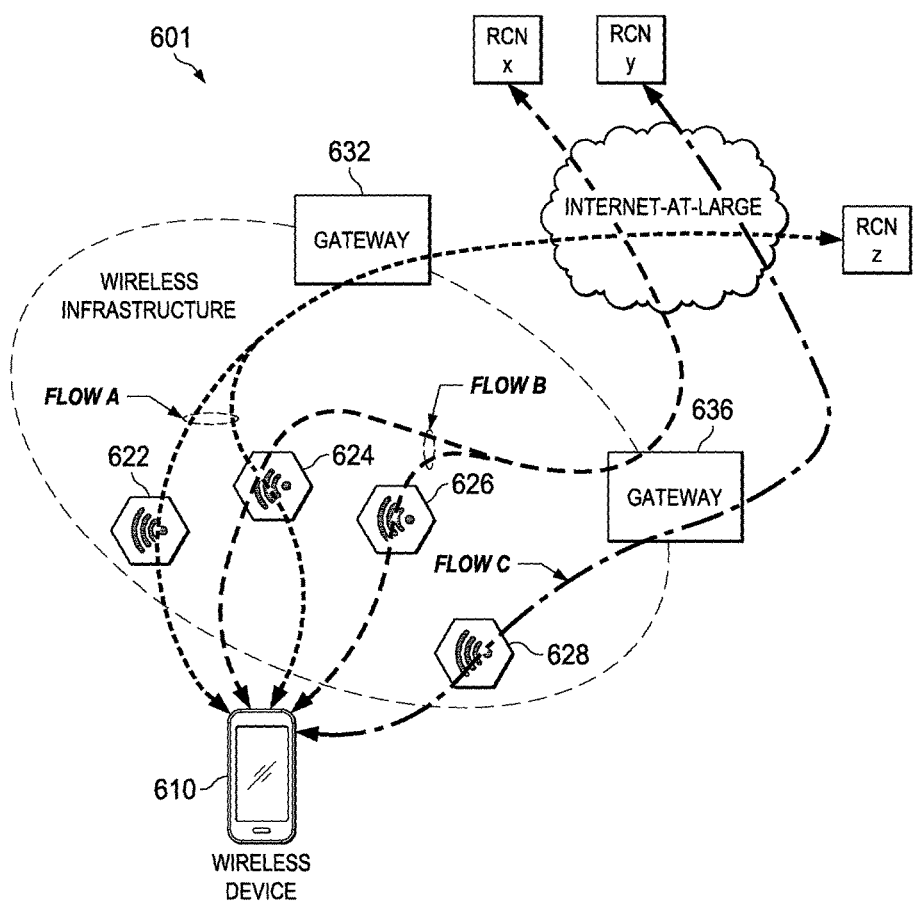
FIGS. 6A-6B illustrate a diagram of an embodiment flow-based ingress and egress selection scheme involving a mobile device.
Figure 6B:
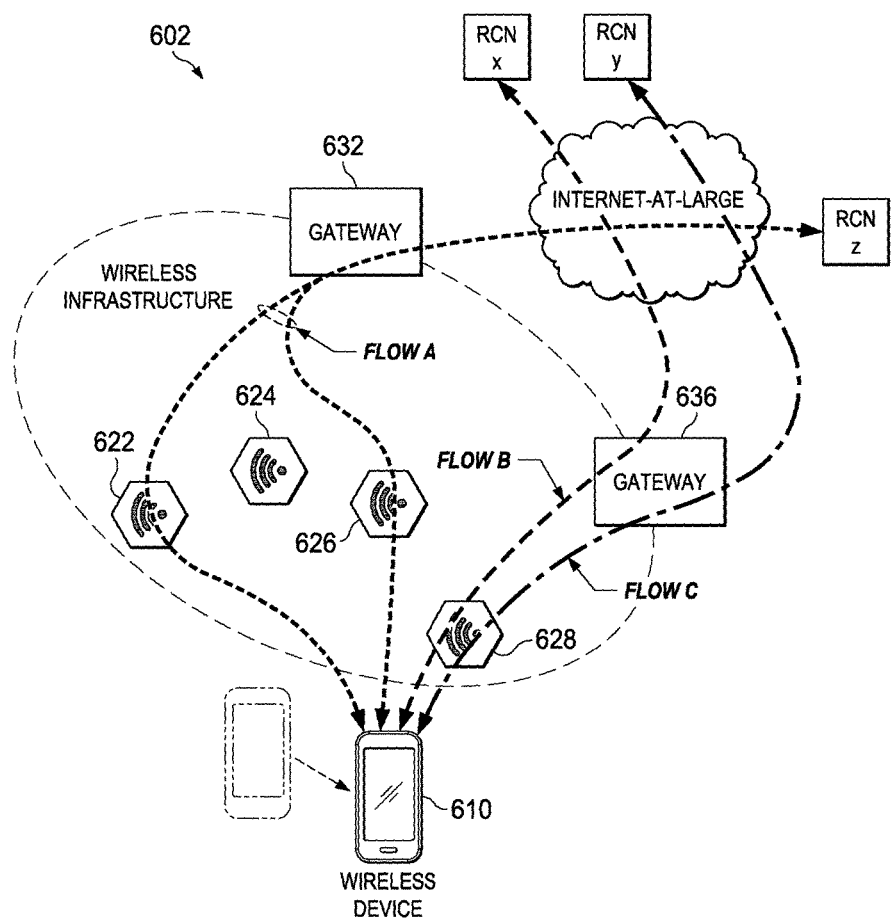

In some embodiments, network ingress and egress points for a packet flow may be determined based on the characteristics of an individual traffic flow in accordance with an availability of network and/or radio resources, as well as network operator policies. For instance, each traffic flow passing through a radio edge node (e.g., AP) may be associated with a radio access technology (e.g., Long Term Evolution (LTE), Institute of Electrical and Electronics Engineers (IEEE) 802.11, etc.), and a set of cooperating transmit/reception points (e.g., radio access network transmission points (RAN-TPs) and/or RAN reception points (RAN-RPs)) based on one or more criteria, e.g., QoS requirements, available radio resources, available backhaul resources, etc. Alternatively, each traffic flow passing through a network edge node (e.g., border gateway) may be associated with a route to/from a remote corresponding node (RCN) and/or a set of edge processing functions (e.g., firewall, network address translation (NAT), intrusion detection) based on mobile network operator costs and/or security policies. FIG. 6A illustrates a flow-based ingress and egress selection scheme 601 where Flow A, Flow B and Flow C are contemporaneously associated with a Wireless Device 610. Flow A is forwarded through RAN transmission points 622 and 624 and Border Gateway 632; simultaneously; Flow B is forwarded through RAN transmission points 624 and 626 and Border Gateway 636; Flow C is forwarded through RAN transmission point 628 and Border Gateway 636. In an embodiment, the RAN transmission points 622, 624, 626 are associated with a first access point, and the RAN transmission point 628 is associated with a second access point. In some embodiments, the Wireless Device 610 may migrate to a different position in the wireless network. This change in position of the Wireless Device 610 may affect path of some flows (e.g., Flows A and B), without affecting the path of other flows (e.g., Flow C). FIG. 6B illustrates a flow-based ingress and egress selection scheme 602 following a change in position of the Wireless Device 610. As shown, this change causes the Flows A and B to flow over different paths, with Flow A being routed through the RAN-TP 626 (rather than the RAN-TP 624), and Flow B being routed through the AP 628 (rather than the RAN-TP 624 and 626). The path of Flow C remains unchanged.

Figure 7:
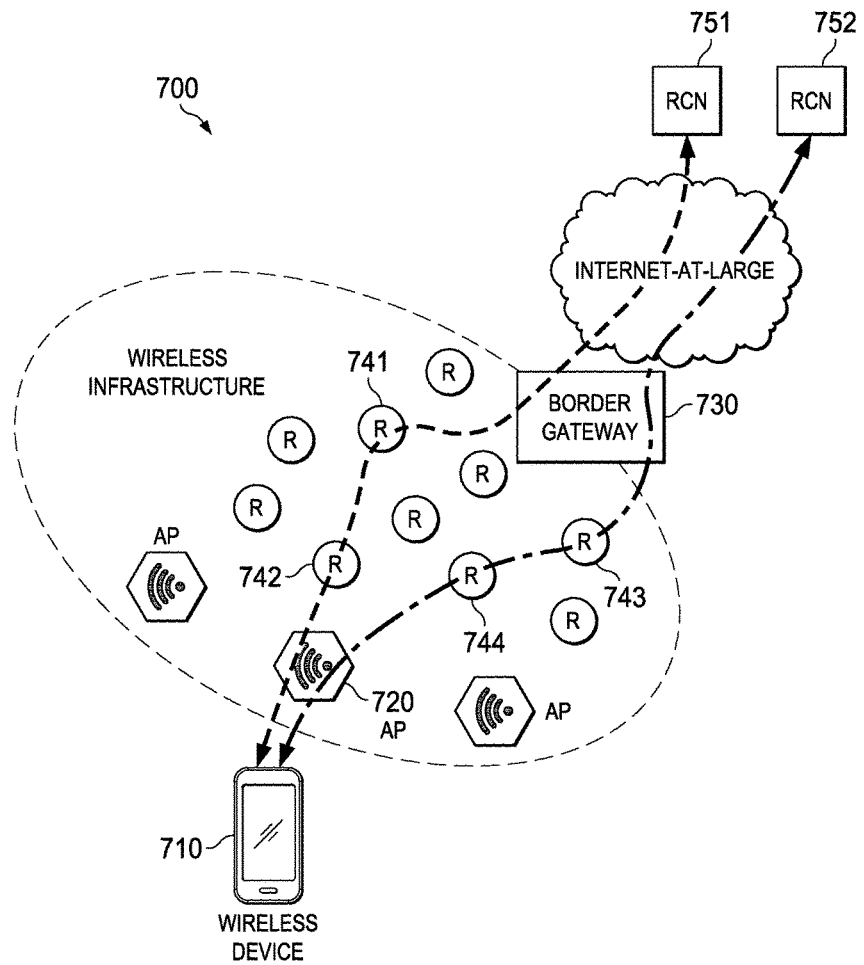
FIG. 7 illustrates a diagram of an embodiment flow-based path selection scheme.

In some embodiments, a packet forwarding path and a processing scheme for a packet flow may be determined based on the characteristics of an individual packet flow (e.g., QoS requirements), an availability of network and radio resources, and/or an applicable service function chain (SFC). FIG. 7 illustrates a flow-based path selection scheme 700. A first downlink packet flow from a remote corresponding node (RCN) 751 may be forwarded to a Wireless Device 710 through a serving Access Point 720 over a path from a border gateway 730 through routers 741 and 742. A second downlink packet flow from an RCN (RCN) 752 may be forwarded to the Wireless Device 710 through the serving AP 720 over a different path from the border gateway 730 through routers 743 and 744. The RCNs 751 and 752 may be implemented on the same platform, while different IP addresses assigned to the different packet flows cause each flow to be treated individually. A packet flow path may be handled by either a uni-directional scheme or a bi-directional scheme. For example, in a bi-directional scheme, packet flows in the uplink direction will follow the same path as packet flows in the downlink direction while in a uni-directional scheme packet flows in the uplink direction (e.g. requests sent to an RCN) may follow a different path from packet flows in the downlink direction (e.g. responses received from an RCN) and may be handled in accordance with different processing schemes. A forwarding information base (FIB) used by routers to determine the path that a packet flow will follow may be either populated by a centralized traffic management (TM) entity or may be the result of information exchanged among the routers using a conventional distributed routing protocol.

In some embodiments, a localized flow-based mobility management scheme may be provided by assigning a potentially different Internet Protocol address to each packet flow initiated by a mobile device. Packet flows tend to be short lived with an average of 30-35 packets per flow for web browsing activities. As a result, a packet flow may be completed, and the associated IP address may be released, before the mobile device changes its point of attachment to the network. In these instances, downlink flows can be forwarded directly to the network attachment point serving the mobile device without incurring the tunneling and control signaling overheads associated with protocols such as Proxy Mobile IPv6. A mobile device may change an attachment point during an inactive or quiescent period in which the mobile device has no active packet flows, which may obviate the need for any actions related to a packet flow or IP address maintenance. The RAN transmission and/or reception points that may be used by a mobile wireless device (WD) may be changed during the lifetime of the packet flow. Such changes may be the result of mobile WD movement, a change in radio link environment (e.g. increasing interference), and/or a change in network infrastructure condition (e.g. backhaul congestion). In some instances, the changes may only affect a subset of the packet flows emanating from a mobile WD. For example, as illustrated in FIG. 6B, a change may affect a path of some traffic flows (e.g., Flows A and B), without affecting a path of other traffic flows (e.g., Flow C). When a change occurs, affected packet flows may be redirected to a neighboring AP. Accordingly, mobility management actions may be localized, and the processing load may be distributed over network nodes that are located at or near the radio edge of a network. As a result, latency and network signaling overhead may be reduced and the need for specialized high-capacity mobility-aware routers (e.g. Serving Gateway (SGW) in a core network) may be eliminated.

Figure 8:
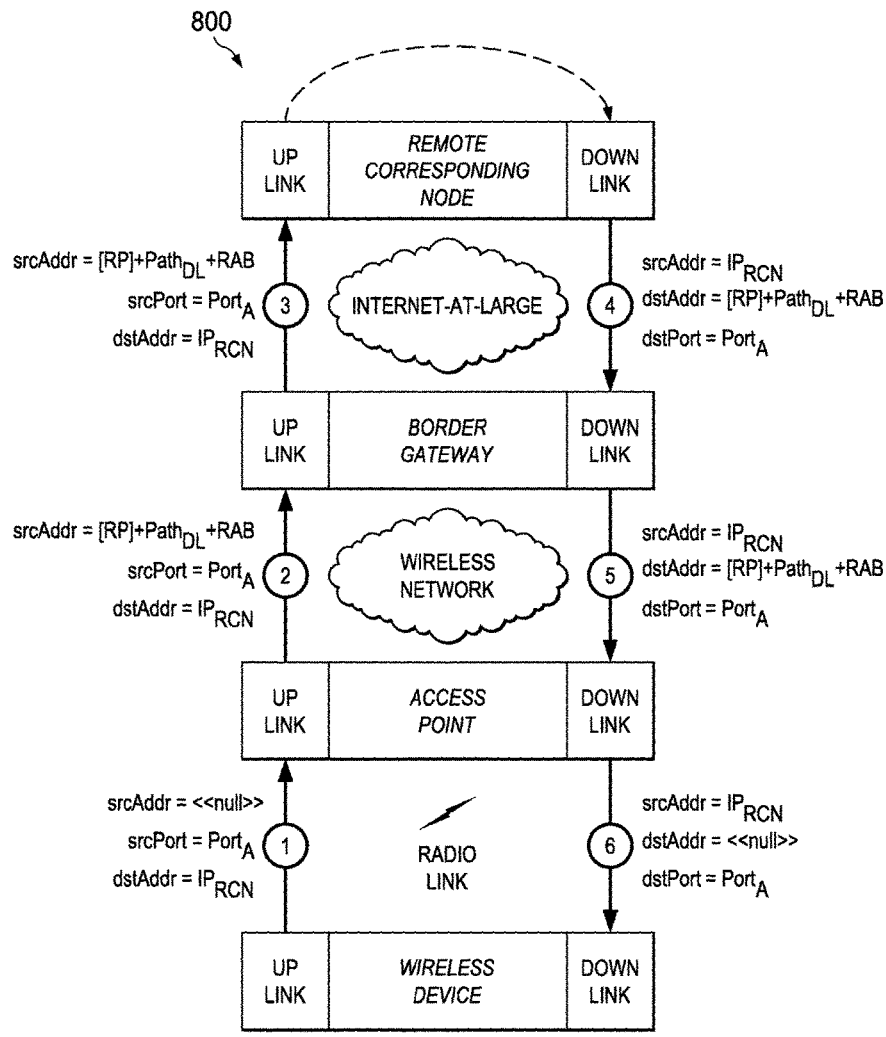
FIG. 8 illustrates a diagram of an embodiment packet forwarding scheme over a designated path.

In some embodiments, packets in a downlink flow and an uplink flow may be forwarded on a best-effort basis over either a shortest path or a least-cost path. In other embodiments, a traffic management (TM) entity may determine that the packets in the downlink flow and/or the uplink flow should be forwarded over a pre-determined path based on a QoS requirement of the packets, or to ensure that network traffic is balanced across multiple paths. For example, the particular path may be a best-effort path towards a designated end point (e.g. a serving AP), a traffic-engineered path identified by a TM entity, and/or a service function path identifying a sequence of service functions for the packets. FIG. 8 illustrates a diagram of an embodiment packet forwarding scheme 800 for communicating a packet over a designated path. A network node (e.g., serving AP) may insert an assigned flow address into the header of packets received from a WD in order to minimize signaling overhead over a radio link. In step 1 of the packet forwarding scheme 800, a WD transmits an uplink packet over a radio access bearer defined on a radio link between the WD and an AP. The WD may insert a destination address (e.g. $IP_{RCN}$) and TCP/UDP port into a packet header along with a source TCP/UDP port (e.g. $Port_A$) associated with the packet flow. In one example, the WD may insert an unspecified (e.g., null) source IP address into the packet header before transmitting the packet over the radio link. In another example, the WD may insert a link local source IP address into the packet header before transmitting the packet over the radio link.

When a radio edge network node (e.g., serving AP) receives the uplink packet, the radio edge network node may assign a flow-based address to the packet. The flow-based address may be embedded into a FH portion of the source address in the packet header. The flow-based address may be generated autonomously by the radio edge node. Alternatively, the flow-based address may be generated based on instructions received from a TM entity. The source address may include a routing prefix (RP) that reflects a topology of a wireless network encompassing the serving AP(s). As demonstrated in the example depicted by FIG. 8, context information in the FH of the source address may identify a path associated with a downlink packet flow and a radio access bearer (RAB). For example, the FH may identify a traffic-engineered path or a service function path, the RAB, a QoS requirement, or combinations thereof. In another example, the FH may identify a best-effort path to the serving AP and the RAB. An RAB ID may identify an uplink radio bearer over which the packet was received. Alternatively, the RAB ID may be associated with a corresponding downlink radio bearer, which may be used to transport any returning downlink packets to the WD. In step 2 of the packet forwarding scheme 800, the AP may forward the uplink packet to an egress border gateway using an IP packet routing scheme/functions, e.g., a longest prefix match, a protocol oblivious forwarding function, etc. In some situations, an uplink traffic-engineered path may be selected when each router includes the path ID embedded in the source address during its path selection processing. In step 3 of the packet forwarding scheme 800, the border gateway may forward the packet to the RCN (e.g., through the Internet-at-large) in accordance with an IP packet routing scheme. In an embodiment, the border gateway replaces a local routing prefix contained in the source address of the packet with a global routing prefix that reflects a location of the border gateway in a network, e.g., in the Internet-at-large.

In step 4 of the packet forwarding scheme 800, the RCN may generate a downlink packet by embedding the source address and the source TCP/UDP port of the uplink packet into the destination address and the port portion of a downlink packet header, respectively, of the downlink packet. The RCN may then forward the downlink packet to an ingress border gateway through the Internet-at-large using an IP packet routing scheme based on the routing prefix in the downlink packet header. Notably, the ingress border gateway that receives the downlink packet may not be the same as the egress border gateway that transmitted the uplink packet because routing decisions may be different within the Internet-at-large and/or the wireless infrastructure network. The flow information included in the FH of the downlink destination IP address may be used to allow uplink and downlink flows to be routed through different border gateways and to eliminate the need to exchange context information between border gateways. In step 5 of the packet forwarding scheme 800, the ingress border gateway routes the downlink packet to the serving AP through the wireless infrastructure network using a route selection function/algorithm, e.g., based on a longest-prefix match that includes the (local) routing prefix, the path ID, a QoS code point embedded in the flow-based destination address, or combinations thereof. A forwarding information base (FIB) used by the routers in the wireless infrastructure network may be populated by the centralized TM entity or by information exchanged by the routers using a conventional routing protocol. At step 6 of the packet forwarding scheme 800, the serving AP may receive the downlink packet, and then determine the downlink radio bearer and its associated context information based on information (e.g., an RAB ID, etc.) embedded in the flow-based destination address of the downlink packet. The downlink radio bearer may be then used to deliver the packet to the WD. The above-described embodiment packet forwarding scheme may have several benefits. For example, tunnel overhead may be eliminated because packets need not be encapsulated in tunnels. As another example, control signaling overhead may be removed between an AP and a mobility anchor point because a conventional IP routing scheme may be used to forward the downlink packet to the AP. As yet another example, different packet flows may follow different paths through a wireless infrastructure network based on packet forwarding information embedded in the FH of the packet destination address.

Figure 9:
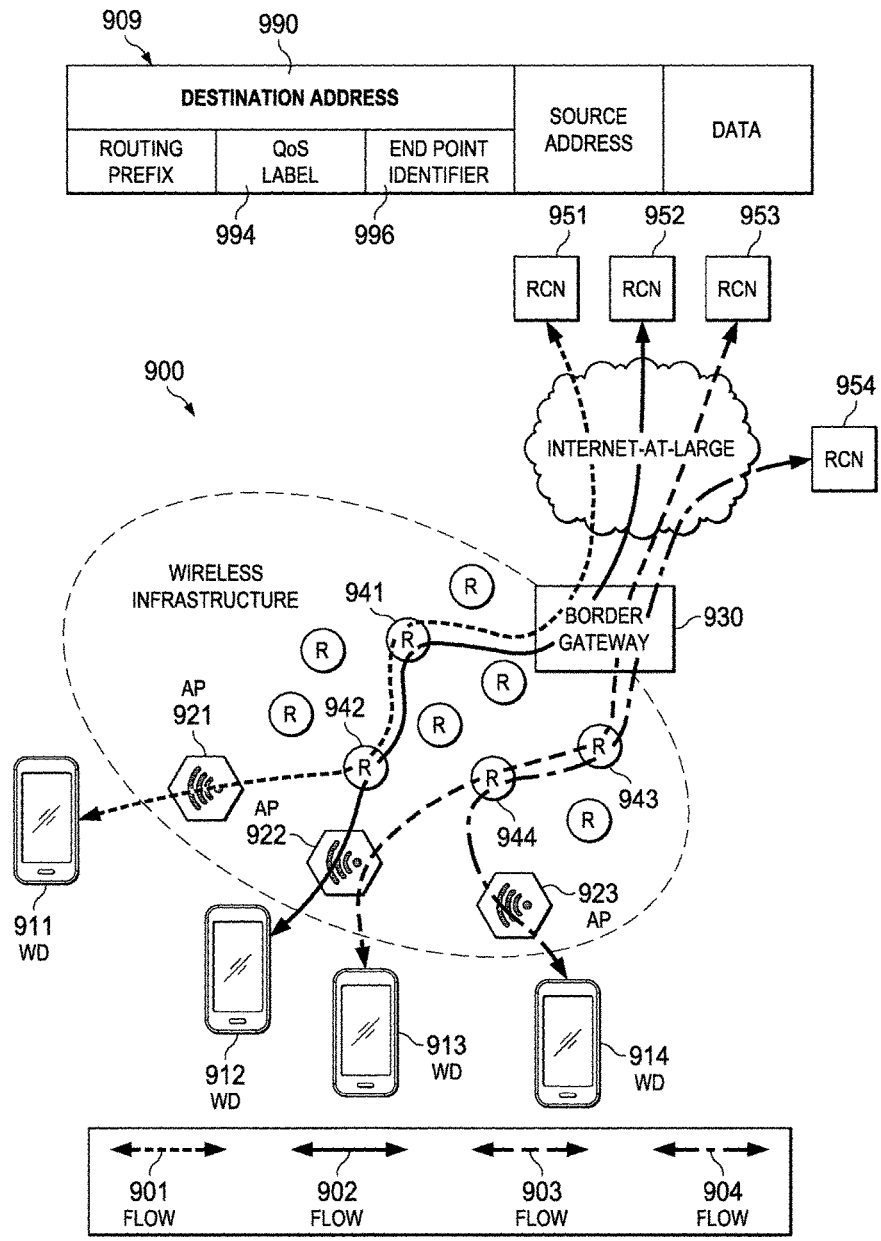
FIG. 9 illustrates a diagram of an embodiment QoS-based flow aggregation scheme.

In some embodiments, an IP address may be assigned to a packet flow to reflect a QoS requirement to be applied to the packet flow. While a traffic class field in a conventional IPv6 header may be used to define a queuing behavior at each router, the traffic class field in the conventional IPv6 header may not identify a forwarding path through a set of network nodes. Beneficially, a QoS Label embedded in the FH of a flow-based address may be used by routers to identify a QoS-enabled route through the set of network nodes. If multiple packet flows have a similar QoS requirement, the QoS-enabled routes may be aggregated into a smaller number of FIB entries in each router using, for example, a conventional longest-prefix match. FIG. 9 illustrates a diagram of an embodiment QoS-based flow aggregation scheme 900 that uses an embodiment IPv6 header 909 to route downlink packets over a wireless infrastructure. As shown, the embodiment IPv6 header 909 includes a flow-based destination address 990 comprising a QoS Label 992 and an End point ID 994. In an embodiment, the flow-based destination address 990 is a destination address of a downlink packet, and is copied from the source address of an uplink packet.

In this example, a packet flow 901 is communicated from an RCN 951 to a WD 911, packet flow 902 is communicated from an RCN 952 to a WD 912, a packet flow 903 is communicated from an RCN 953 to a WD 913, and a packet flow 904 is communicated from an RCN 954 to a WD 914. The packet flows 901 and 902 may have a similar QoS requirement. APs 921, 922 associated with the WDs 911, 912 may assign IPv6 addresses to the packet flows 901, 902 that include the same QoS Label (e.g., QoS-A). Likewise, APs 922, 923 associated with the WDs 913, 914 may assign IPv6 addresses to the packet flows 903, 904 that include the same QoS Label (e.g., QoS-B).

Routers 941, 942 along a path from the border gateway 930 to the APs 921, 922 may have Forwarding Information Base (FIB) tables that identify a next-hop for packets whose destination address includes the QoS Label 'QoS-A.' Likewise, the routers 943, 944 along a path from the border gateway 930 to the APs 922, 923 may have FIB tables that identify a next-hop for packets whose destination address includes the QoS Label 'QoS-B.' The routers 941, 942, 943, 944 may maintain and update the FIB tables based on instructions from a centralized TM entity, or based on a distributed routing protocol exchange.

The border gateway 930 may direct the packet flows 901, 902 having the QoS label 'QoS-A' to the router 941 upon receiving the packet flows 901, 902 from the RCNs 951 and 952. The router 941 may then direct the packet flows 901, 902 to the router 942. In an embodiment, the border gateway 930 decides to forward the packet flows 901, 902 to the router 941 based on a longest-prefix match encompassing the QoS Label 'QoS-A.' Likewise, the router 941 may decide to forward the packet flows 901, 902 to the router 942 based on a longest-prefix match encompassing the QoS Label 'QoS-A.' The router 942 determines that the packet flow 901 should be forwarded to the AP 921, and that the packet flow 902 should be forwarded to the AP 922. The router 942 may come to this determination by applying a longest-prefix match algorithm to the QoS Label 'QoS-A' and the End point ID carried by packets in the packet flows 901, 902.

In addition, the border gateway 930 may direct the packet flows 903, 904 having the QoS label 'QoS-B' to the router 943 upon receiving the packet flows 903, 904 from the RCNs 953 and 954. The router 943 may then direct the packet flows 903, 904 to the router 944. These routing decisions may be made by determining a longest-prefix match encompassing the QoS Label 'QoS-B.' The router 944 determines that the packet flow 903 should be forwarded to the AP 922, and that the packet flow 904 should be forwarded to the AP 923. The router 942 may come to this determination by applying a longest-prefix match algorithm to the QoS Label 'QoS-B' and the End point ID carried by packets in the packet flows 903, 904.

Figure 10:
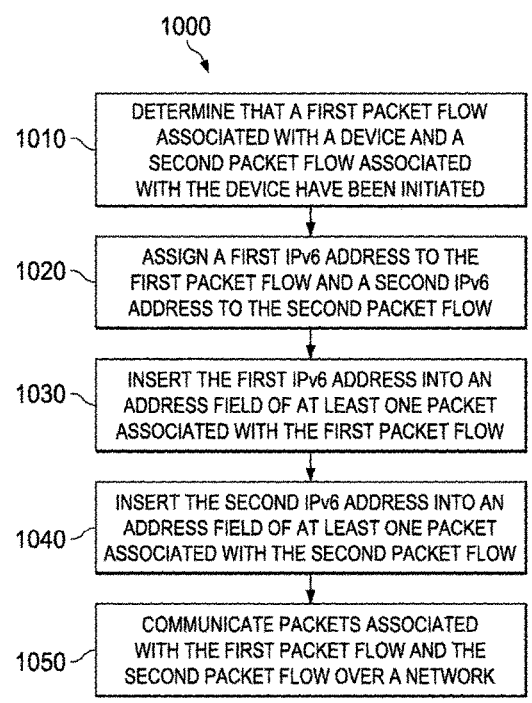
FIG. 10 illustrates a flowchart of an embodiment method 1000 for signaling flow-handling instructions in IPv6 addresses.

In some embodiments, different IP addresses may be assigned to different packet flows associated with the same device so that the packet flows are processed/forwarded according to different flow handling instructions associated with the respective IP addresses. In some embodiments, the flow handling instructions are explicitly embedded in the IP address, while in other embodiments the address is selected in accordance with a desired flow handling that has been a priori associated with the address. FIG. 10 illustrates an embodiment method 1000 for signaling flow-handling instructions in IPv6 addresses, as might be performed by a network node. The method 1000 begins at step 1010, where the network node determines that a first packet flow and a second packet flow have been initiated. Both the first packet flow and the second packet flow are associated with the same device. Next, the method 1000 proceeds to step 1020, where the network node assigns a first IPv6 address to the first packet flow and a second IPv6 address to the second packet flow. The IPv6 addresses are associated with different flow handling instructions. Next, the method 1000 proceeds to step 1030, where the network node inserts the first IPv6 address into at least one packet in the first packet flow. The method 1000 then proceeds to step 1040, where the network node inserts the second IPv6 address into at least one packet in the second packet flow. At step 1050, the network node communicates packets associated with the first packet flow and the second packet flow over a network. The packets associated with the first packet flow are processed, or forwarded, in accordance with different flow handling instructions than the packets associated with the second packet flow by virtue of the packet flows being assigned different IPv6 addresses.

In some scenarios, multiple packet flows emanating from a Wireless Device may share the same context (e.g., receive the same treatment) and may be associated with the same IP flow address. In these instances, existing techniques may be used to distinguish between the flows using fields outside the IP packet header (e.g., by using the port number in an encapsulated TCP or UDP header).

Within the data plane, flow-based addresses may be used to identify the nature of the packet flow. For example, in a unicast packet flow, packets containing control information (e.g., acknowledgment or rate control) may be distinguished from those that contain only data. For video streams, packets that contain I-frames may be distinguished from those that contain B-frames or P-frames. For NACK-oriented reliable multicast, forward link packets that contain initial data transmissions may be distinguished from those that contain retransmissions or those that contain FEC-encoded retransmissions.

In addition to distinguishing between different types of data plane packet flows, flow-based addresses may also be used to distinguish between various types of control plane and management plane traffic.

Notably, maintaining context information at ingress points of a domain/network increases the amount of storage resources needed to support a traffic flow, as well as increases processing requirements to, for example, encapsulate each incoming packet into an appropriate tunnel packet. Embodiments of this disclosure reduce the amount of context information that needs to be stored at the ingress point of a network by embedding some context information in the IPv6 address of a packet. In an embodiment, a device may be assigned a flow-based IPv6 address that includes embedded context information related to flow handling (e.g., downlink flow handling). This may obviate the need to store packet flow context in gateway routers and access points.

FH embedded IPv6 addresses can be switched/processed by commercially available, off-the-shelf routers, which may obviate the need to deploy specialized routing protocols and packet forwarding engines. Standard router forwarding mechanisms (e.g., longest prefix match) may be used to forward a flow through a pre-defined Service Function Chain, forward a flow over a traffic-engineered path, or aggregate forwarding table entries to handle flows with similar QoS requirements. A packet flow can be routed according to policies employed by the Network Operator.

In some scenarios, a routing prefix in a flow-based address may include a region prefix that may be used for routing within a local network. For example, as illustrated in FIG. 6, this may be comprised of (64-m) bits in the upper 64 bits of a flow-based address. In some cases, the region prefix may allow for the use of the same Flow Handles in different regions/domains of a network.

In some instances, a device may also provide assistance in identifying and classifying new packet flows. For example, the device may provide a new packet flow indication (NPFI) to the network whenever one of its applications initiates a new flow. The NPFI may be included in an IPv6 packet header (e.g., in the Flow Label or Traffic Class field), or encoded as a reserved value of the IPv6 source address, or it may be signaled over a Radio Access Bearer (e.g., in a MAC Control Element).

Before transmitting a packet, a device may be instructed by the network to construct and insert a Flow Handle into the source address field of the IPv6 packet header. In one example, the instructions to a Wireless Device (WD) are determined on a per-flow basis via Radio Resource Control (RRC) signaling. In this scenario, the Wireless Device sends an RRC request to the serving Access Point whenever it determines that a new packet flow is being initiated. Based on information provided by the WD or derived by the AP, an appropriate Flow Handle is constructed by the network and communicated to the WD in an RRC response.

In another example, the instructions are determined on a per-RAB basis via RRC signaling. In this scenario, the Wireless Device sends an RRC request to the serving Access Point whenever it determines that a new Radio Access Bearer is being instantiated. Based on information provided by the WD or derived by the AP, a template and policy rules for generating appropriate Flow Handles are communicated to the WD in an RRC response. These are used by the WD to generate a Flow Handler for every packet flow transmitted over the RAB.

In yet another example, the instructions are determined on a per-Device or per-interface basis via RRC signaling. In this scenario, the Access Point sends an RRC command to the Wireless Device that includes a template and policy rules for generating appropriate Flow Handles. These are used by the WD to generate a Flow Handle for every packet flow transmitted to the network over the corresponding radio link interface.

In yet another example, the instructions are determined on a per-AP or per-group basis via RRC signaling or System Information Block (SIB) broadcast. In this scenario, the Access Point multicasts (or broadcasts) an RRC command to a selected group (or to all) of the Wireless Devices in its coverage area that may include template and policy rules for generating appropriate Flow Identifiers. These rules may be used by the targeted Wireless Devices to generate a Flow Handle for every packet flow transmitted to the network via that Access Point.

When a packet is received with a Flow Handle provided by a device, a network edge node (e.g., the serving Access Point) may complete construction of an IPv6 flow-based source address by inserting locally-derived information into the Flow Handle (e.g., Access Point identifier, RAB identifier) along with a Routing Prefix (RP) that reflects the topology of the network encompassing the network edge node.

Embodiments of this disclosure provide techniques for network de-allocation of flow-based addresses. A flow-based address may be marked as inactive by a network node (e.g., an Access Point) whenever all of the packet flows associated with that address are deemed to have ended. The end of a packet flow may be determined, for example, by inspecting one or more fields from a TCP header or an application header (e.g., HTTP, RTP), by identifying a change in the characteristics of the Radio Access Bearer (RAB) over which the packet flow was received, or by expiration of a packet flow inactivity timer.

In some instances, a device may also provide assistance in identifying the end of a packet flow. For example, the device may provide a packet flow termination indication (PFTI) to the network whenever one of its applications terminates a flow. The PFTI may be included in an IPv6 packet header (e.g., in the Flow Label or Traffic Class field), or encoded as a reserved value of the IPv6 source address, or it may be signaled over a Radio Access Bearer (e.g., in a MAC Control Element).

In a mobile IP environment, some packet flows may be short lived and may be completed, and the associated IP address released, without the device changing its point of attachment. However there may be occasions when a mobile device is faced with the transfer of a large data object. In these instances, the effects of being mobile during the data transfer can be mitigated by transferring the data object as a series of smaller chunks rather than as a single monolithic entity. Each chunk can be transferred separately such that the transfer of each chunk is represented as a different packet flow such that each packet flow is assigned its own IPv6 address. Downloading of a chunk can be completed as a short-lived flow within the coverage of a single Access Point before releasing the assigned IPv6 address. If the device is mobile, this would allow different chunks to be transferred through different points of attachment using different IPv6 addresses, obviating the need to handover a packet flow and minimizing handover overhead. In some instances, when a device changes its point of attachment while a packet flow is active, the device can abort the initial packet flow and request retransmission of the interrupted chunk through a new request initiated as a new packet flow with a new IPv6 address that is associated with the new point of attachment. Notably, HTTP GET and PUT requests can be qualified by a RANGE that identifies the chunk as a sequence of bytes within the data object. This technique can also be applied to the downloading of large video files and streams using, for example, the Dynamic Adaptive Streaming over HTTP protocol.

In some situations, an application running on a device may sporadically exchange a short burst of packets with a Remote Corresponding Node (RCN). This kind of background traffic may be used, for example, to query a mail server or a social network server for updates, or to provide an update on application status to a remote server.

The automatic assignment of a flow-based address to a Wireless Device for the duration of an exchange with the RCN may: obviate the need for mobility events and their control signaling overheads to update forwarding context in the network; obviate the need for signaling overheads associated with address assignment; avoid the use of tunnels within the wireless network to forward responses from the RCN to the WD at its current point of attachment; and reduce the amount of device-specific context that must be maintained by the network.

Aspects of this disclosure provide techniques for MTC Traffic Management. Per-flow address assignment simplifies a number of aspects related to the handling of traffic to and from a Machine-Type Communications Device (MTCD). In one example, flow-based address assignments by the network may be used to provide late binding of an IP address to an MTC Device in a manner that is independent of, and transparent to, the MTC Device. This may avoid the overhead associated with IP address provisioning during massive deployment of commodity MTC Devices and conserve battery power in the MTCDs.

Machine-type communications (MTC) traffic may share many of the same characteristics as background traffic in that an MTC Device (MTCD) may sporadically exchange a short burst of packets with a Remote Corresponding Node. Therefore, for unicast MTC traffic, the benefits of using flow-based addressing are similar to those of using flow-based addressing for background traffic.

Figure 11:
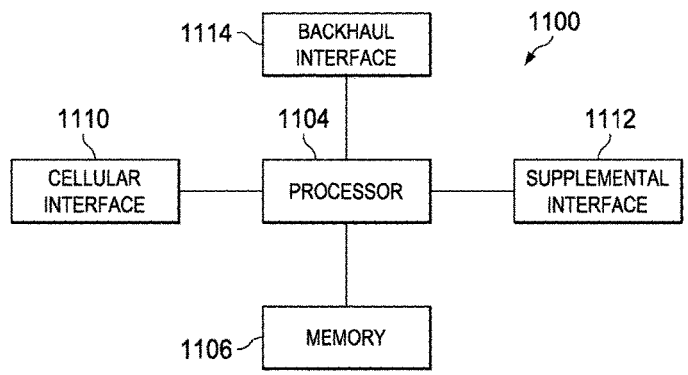
FIG. 11 illustrates a diagram of an embodiment communications device.

FIG. 11 illustrates a block diagram of an embodiment of a communications device 1100, which may be equivalent to one or more devices (e.g., wireless devices, network nodes, etc.) discussed above. The communications device 1100 may include a processor 1104, a memory 1106, a wireless interface 1110, a supplemental interface 1112, and a wired interface 1114, which may (or may not) be arranged as shown in FIG. 11. The processor 1104 may be any component capable of performing computations and/or other processing related tasks, and the memory 1106 may be any component capable of storing programming and/or instructions for the processor 1104. The wireless interface 1110 may be any component or collection of components that allows the communications device to communicate using a wireless signal, and may be used to receive and/or transmit information over a wireless connection of a radio access network using, for instance, a 3GPP Long Term Evolution (LTE) protocol. The optional supplemental interface 1112 may be any component or collection of components that allows the communications device to communicate data or control information via a supplemental protocol. For instance, the supplemental interface 1112 may be a secondary wireless interface for communicating in accordance with a Wireless-Fidelity (Wi-Fi) or Bluetooth protocol. Alternatively, the supplemental interface 1112 may be a wired interface using, for instance, a Universal Serial Bus protocol. The wireline interface 1114 may be optionally included in the communications device and may comprise any component or collection of components that allows the communications device to communicate with another device via a wired network using, for instance, an Ethernet protocol.

Figure 12:
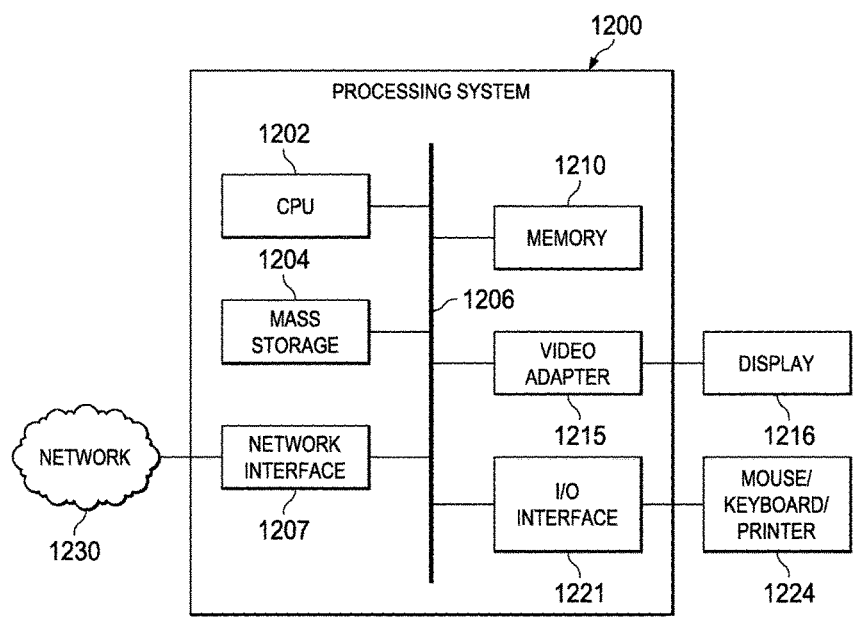
FIG. 12 illustrates a diagram of an embodiment computing platform.

FIG. 12 is a block diagram of a processing system 1200 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1200 may comprise a processing unit equipped with one or more input/output devices 1216, 1224, such as a speaker, microphone, mouse, touchscreen, keypad, keyboard, printer, display, and the like. The processing system 1200 may include a central processing unit (CPU) 1202, memory 1210, a mass storage device 1204, a video adapter 1215, and an I/O interface 1221, all connected to a bus 1206.

The bus 1206 may be one or more of any type of several bus architectures including a memory bus or memory controller, a peripheral bus, video bus, or the like. The CPU 1202 may comprise any type of electronic data processor. The memory 1210 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1210 may include ROM for use at boot-up, and DRAM for program and data storage for use while executing programs.

The mass storage device 1204 may comprise any type of non-transitory storage device configured to store data, programs, and other information and to make the data, programs, and other information accessible via the bus 1206. The mass storage device 1204 may comprise, for example, one or more of a solid state drive, hard disk drive, a magnetic disk drive, an optical disk drive, or the like.

The video adapter 1215 and the I/O interface 1221 provide interfaces to couple external input and output devices to the processing system 1200. As illustrated, examples of input and output devices include the display 1216 coupled to the video adapter 1215 and the mouse/keyboard/printer 1224 coupled to the I/O interface 1221. Other devices may be coupled to the processing system 1200, and additional or fewer interfaces or interface cards may be utilized. For example, a serial interface such as Universal Serial Bus (USB) (not shown) may be used to provide an interface for a printer 1224.

The processing system 1200 also includes one or more network interfaces 1207, which may comprise wired links, such as an Ethernet cable or the like, and/or wireless links to access nodes or different networks 1230. The network interface 1207 allows the processing system 1200 to communicate with remote units via the networks 1230. For example, the network interface 1207 may provide wireless communication via one or more transmitters/transmit antennas and one or more receivers/receive antennas. In an embodiment, the processing system 1200 is coupled to a local-area network 1230 or a wide-area network 1230 for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating a packet flow in a communication network, the method comprising:
   constructing, by a first network node, a first flow handle (FH) in accordance with processing and/or forwarding operations to be applied to a first packet by a second network node:

replacing, by the first network node, at least a portion of an interface identifier in an Internet Protocol (IP) version six (IPv6) source address field of an IPv6 header of the first packet with the first FH; and transmitting the first packet to the second network node, the first FH embedded in the IPv6 source address field of the first packet instructing the second network node to forward or process the first packet in accordance with flow information specified by the first FH.

2. The method of claim 1, further comprising:

constructing, by the first network node, a second FH in accordance with processing and/or forwarding operations to be applied to a second packet by the second network node, the second packet being associated with a different packet flow than the first packet:

replacing, by the first network node, at least a portion of an interface identifier in an IPv6 source address field of the second packet with the second FH; and transmitting the second packet to the second network node, the second FH embedded in the IPv6 source address field of the second packet instructing the second network node to forward or process the second packet in accordance with flow information specified by the second FH, wherein the second FH includes different flow information than the first FH such that the second network node is instructed to forward or process the second packet differently than the first packet.

3. The method of claim 1, wherein the first FH specifies a packet flow ID that identifies a particular sequence of packets.

4. The method of claim 1, wherein the first FH specifies a service function chain (SFC) ID that identifies a pre-defined SFC.

5. The method of claim 1, wherein the first FH specifies an access point (AP) ID that identifies a network AP.

6. The method of claim 1, wherein the first FH specifies a radio bearer ID that identifies a radio access link connection.

7. The method of claim 1, wherein the first FH specifies a path ID that identifies a pre-defined path.

8. The method of claim 1, wherein the first FH specifies a quality of service (QoS) code point that identifies a QoS requirement of the first packet.

9. The method of claim 1, wherein the first FH specifies a device ID that identifies an end node.

10. The method of claim 1, wherein one or more intermediate network nodes are positioned between the first network node and the second network node.

11. The method of claim 1, wherein the first network node is an end node.

12. The method of claim 1, wherein the first network node is a network access point.

13. A first network node comprising:
a processor; and
a non-transitory computer readable storage medium storing programming for execution by the processor, the programming including instructions to:
construct a first flow handle (FH) in accordance with processing and/or forwarding operations to be applied to a first packet by a second network node;
replace at least a portion of an interface identifier in an Internet Protocol (IP) version six (IPv6) source address field of an IPv6 header of the first packet with the first FH; and
transmit the first packet to the second network node, the first FH embedded in the IPv6 source address field of the first packet instructing the second network node to forward or process the first packet in accordance with flow information specified by the first FH.

14. A method for processing or forwarding a packet received over a communication network, the method comprising:
receiving, by a second network node from a first network node, a packet having a flow handle (FH) embedded in an Internet Protocol (IP) version six (IPv6) destination address field of an IPv6 header of the packet, wherein the FH replaces at least a portion of an interface identifier in the IPv6 destination address field of the packet; and
processing or forwarding, by the second network node, the packet in accordance with flow information specified by the FH embedded in the IPv6 destination address field of the packet.

15. The method of claim 14 wherein the processing or forwarding performed by the second network node is different than the processing or forwarding performed by the second network node on a previously received packet having an FH embedded in an IPv6 destination address field of the previously received packet.

16. The method of claim 14, wherein processing or forwarding the packet in accordance with the flow information specified by the FH embedded in the IPv6 destination address field of the packet comprises:
identifying a path or a next-hop associated with flow information specified by the FH embedded in the IPv6 destination address field of the packet; and
forwarding the packet over the identified path or to the identified next-hop.

17. The method of claim 14, wherein processing or forwarding the packet in accordance with the flow information specified by the FH embedded in the IPv6 destination address field of the packet comprises:
identifying a quality of service (QoS) requirement associated with the FH embedded in the IPv6 destination address field of the packet;
selecting a path capable of satisfying the QoS requirement; and
forwarding the packet over the path.

18. The method of claim 14, wherein processing or forwarding the packet in accordance with the flow information specified by the FH embedded in the IPv6 destination address field of the packet comprises:
identifying a service function associated with the FH embedded in the IPv6 destination address field of the packet; and
applying the service function to the packet.

19. The method of claim 14, wherein the flow information specified by the FH comprises a packet flow ID that identifies a particular sequence of packets.

20. The method of claim 14, wherein the flow information specified by the FH further comprises a service function chain (SFC) ID that identifies a pre-defined SFC.

21. The method of claim 14, wherein the flow information specified by the FH further comprises an access point (AP) ID that identifies a network AP.

22. The method of claim 14, wherein the flow information specified by the FH further comprises a radio bearer ID that identifies a radio access link connection.

23. The method of claim 14, wherein the flow information specified by the FH further comprises a path ID that identifies a pre-defined path.

24. The method of claim 14, wherein the flow information specified by the FH further comprises a quality of service (QoS) code point that identifies a QoS requirement of the packet.

25. The method of claim 14, wherein the flow information specified by the FH further comprises a device ID that identifies an end node.

26. A second network node comprising:
a processor; and
a non-transitory computer readable storage medium storing programming for execution by the processor, the programming including instructions to:
receive, from a first network node, a packet having a flow handle (FH) embedded in an Internet Protocol (IP) version six (IPv6) destination address field of an IPv6 header of the packet, wherein the FH replaces at least a portion of an interface identifier in the IPv6 destination address field of the packet; and
process or forward the packet in accordance with flow information specified by the FH embedded in the IPv6 destination address field of the packet.

27. A method for allocating Internet Protocol (IP) version six (IPv6) network addresses, the method comprising:
determining that a first packet flow associated with a device and a second packet flow, different from the first packet flow, associated with the device have been initiated;
assigning, from a pool of available addresses, a first IPv6 address to the first packet flow and a second IPv6 address to the second packet flow, the first IPv6 address being different than the second IPv6 address;
inserting the first IPv6 address into an IPv6 source address field of an IPv6 header in at least one packet associated with the first packet flow;
inserting the second IPv6 address into an IPv6 source address field of an IPv6 header in at least one packet associated with the second packet flow; and
communicating packets associated with the first packet flow and the second packet flow over a network.

28. The method of claim 27, wherein:
inserting the first IPv6 address includes inserting the first IPv6 address into the IPv6 source address field of every packet associated with the first packet flow, and inserting the second IPv6 address includes inserting the second IPv6 address into the IPv6 source address field of every packet associated with the second packet flow.

29. The method of claim 27, wherein the step of assigning includes selecting the first IPv6 address in accordance with a desired forwarding or processing of the first packet flow at a second network node in the network.

30. The method of claim 27, further comprising:
determining that the first packet flow has been terminated prior to termination of the second packet flow; and
in response to determining that the first packet flow has been terminated, ending the assignment of the first IPv6 address to the first packet flow associated with the device, and returning the first IP address to the pool of available addresses, wherein the second IPv6 address remains assigned to the second packet flow associated with the device after the first IPv6 address is returned to the pool of available addresses.

* * * * *